United States Patent
Sensu (10) Patent No.: US 8,335,007 B2
(45) Date of Patent: Dec. 18, 2012

(54) IMAGE PROCESSING APPARATUS

(75) Inventor: Minami Sensu, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 489 days.

(21) Appl. No.: 12/656,736

(22) Filed: Feb. 16, 2010

(65) Prior Publication Data

US 2010/0214572 A1 Aug. 26, 2010

(30) Foreign Application Priority Data

Feb. 26, 2009 (JP) ................... 2009-044150

(51) Int. Cl.
- G06F 3/12 (2006.01)
- G06K 15/02 (2006.01)
- G06K 7/10 (2006.01)
- H04N 1/40 (2006.01)

(52) U.S. Cl. ....... 358/1.15; 358/1.11; 358/462; 382/321

(58) Field of Classification Search ............... 358/1.11, 358/1.15, 462; 382/321
See application file for complete search history.

(56) References Cited

U.S. PATENT DOCUMENTS

| | | | |
|---|---|---|---|
| 2006/0210198 A1* | 9/2006 | Suenaga et al. | 382/321 |
| 2007/0203992 A1* | 8/2007 | Coskun et al. | 709/206 |

FOREIGN PATENT DOCUMENTS

| | | |
|---|---|---|
| JP | 8-22474 A | 1/1996 |
| JP | 2008-252544 A | 10/2008 |

* cited by examiner

*Primary Examiner* — Twyler Haskins
*Assistant Examiner* — Fred Guillermety
(74) *Attorney, Agent, or Firm* — Birch, Stewart, Kolasch & Birch, LLP (57) ABSTRACT

A facsimile image reception portion obtains a facsimile image received through a communication line. An image storage portion stores a facsimile image obtained by the facsimile image reception portion. A destination storage portion stores at least one transfer destination of the facsimile image and a set value for limiting received data by making connection with each other for each of transfer destinations. A character recognition portion obtains character data by performing character recognition from a facsimile image obtained by the facsimile image reception portion. A character recognition operation control portion compares a set value for limiting received data to character data obtained by a character recognition portion to control whether or not character recognition by the character recognition portion is continued. An electronic mail creation portion creates an electronic mail in which character data obtained by the character recognition portion is described.

16 Claims, 8 Drawing Sheets

| TRANSFER DESTINATION ID | TRANSFER DESTINATION ADDRESS | RECEIVING LIMIT | UPPER LIMIT OF THE NUMBER OF CHARACTERS |
|---|---|---|---|
| 1 | ueda@abc.co.jp | LIMITED | 50 |
| 2 | yoshida@abc.ne.jp | LIMITED | 124 |
| 3 | sato@abc.ne.jp | LIMITED | 100 |
| 4 | tanaka@abc.ne.jp | LIMITED | 150 |

FIG. 4

FAX COVER LETTER

MONTH XX DATE XX, YEAR XX

| TRANSMITTING DESTINATION MR. TANAKA, SALES DIVISION OF ABC CO., LTD. ||
|---|---|
| PHONE 00-0000-0000 | FAX 11-1111-1111 |

SENDER XXXXXX
XXXXXX CO., LTD.
PHONE : 22-2222-2222
FAX : 22-2222-2222
TRANSMITTING NUMBER OF SHEETS: X SHEETS

SUBJECT: REFERRING TO RESERVATION OF AIR TICKET

PLEASE CONFIRM THE FOLLOWING ATTACHED DOCUMENTS.

● CONFIRMATION FOR RESERVATION

● QUOTATION FOR AIRFARE

PLEASE BE NOTED THAT WE WILL HAVE COMPANY

HOLIDAYS FROM DEC. 29, MONDAY TO JAN. 3, SATURDAY.

WE WILL BE BACK ON JAN. 4, SUNDAY, NEXT YEAR.

SINCERELY YOURS, YAMAMOTO

IMAGE PROCESSING APPARATUS

CROSS-NOTING PARAGRAPH

This non-provisional application claims priority under 35 U.S.C. §119(a) on Patent Application No. 2009-044150 filed in JAPAN on Feb. 26, 2009, the entire contents of which are hereby incorporated herein by reference.

FIELD OF THE INVENTION

The present invention relates to an image processing apparatus, and more particularly to an image processing apparatus having a facsimile receiving function and analyzing a received facsimile image to transfer to a specific transfer destination.

BACKGROUND OF THE INVENTION

There is a strong demand for, by using a mobile telephone, checking a facsimile image when going out by transferring a received facsimile image to a mobile telephone. Therefore, a system has been conventionally devised for transferring a facsimile image to a specific transfer destination by using an electronic mail from an image processing apparatus provided with a facsimile receiving function.

For example, Japanese Laid-Open Patent Publication No. 2008-252544 discloses a method that applies character recognition to an image received by facsimile and transfers the results by describing them in a body of an electronic mail. By this method, it is possible to reduce a capacity of an electronic mail comparing to a method for attaching facsimile image data. In addition, even with a terminal whose viewer function for viewing an image is limited, contents of an image received by facsimile can be checked.

In an invention of Japanese Laid-Open Patent Publication No. 2008-252544, since character recognition processing is performed for all images received by facsimile, many computational resources are needed on the side of an image processing apparatus, thus there is a problem of taking time to transfer.

SUMMARY OF THE INVENTION

An object of the present invention is to provide an image processing apparatus which performs character recognition on a received facsimile image and transfers the image to a specific transfer destination by e-mail, wherein the image processing apparatus is capable of shortening transfer time of facsimile data by reducing the amount of character recognition processing performed at the time of transferring a facsimile image.

It is another object of the present invention to provide an image processing apparatus connectable to a communication line, comprising: a facsimile image reception portion for obtaining a facsimile image which is received through the communication line; an image storage portion for storing the facsimile image which is obtained by the facsimile image reception portion; a destination storage portion for storing at least one transfer destination of the facsimile image in association with a set value for limiting received data for each transfer destination; a character recognition portion for obtaining character data by character recognition of the facsimile image which is obtained by the facsimile image reception portion; a character recognition operation control portion for controlling whether or not character recognition by the character recognition portion is continued by comparing the set value for limiting received data to character data which is obtained by the character recognition portion; and an electronic mail creation portion for creating an electronic mail in which character data obtained by the character recognition portion is described in a body of the electronic mail.

It is another object of the present invention to provide the image processing apparatus, wherein the set value for limiting received data is a set value for limiting the number of characters of the character data or is a set value for limiting data amount of the character data.

It is another object of the present invention to provide the image processing apparatus, wherein the set value for limiting received data is a set value for setting a maximum number of characters or data amount among the number of characters or data amount of character data in association with a plurality of transfer destinations.

It is another object of the present invention to provide the image processing apparatus, wherein the transfer destinations are electronic mail addresses of a portable computer terminal device.

It is another object of the present invention to provide the image processing apparatus comprising a cover letter storage portion capable of storing at least one template of a facsimile cover letter in order to specify a region to be read by the character recognition portion.

It is another object of the present invention to provide the image processing apparatus comprising a layout analysis portion having a function of analyzing a layout structure of the facsimile image based on predetermined conditions and dividing the facsimile image into regions depending on the layout structure, and wherein the character recognition portion obtains character data by performing the character recognition for each of the divided regions.

It is another object of the present invention to provide the image processing apparatus, wherein the character recognition operation control portion has a determination portion for determining whether the number of characters describable in the region where the font size is obtained exceeds the set value for limiting received data by obtaining a font size in the divided region.

It is another object of the present invention to provide the image processing apparatus, wherein the character recognition operation control portion determines whether the character recognition is continued every time predetermined characteristics are obtained from the result of character recognition by the character recognition in a case where the number of characters describable in the region where the font size is obtained in the determination portion exceeds the set value for limiting received data.

It is another object of the present invention to provide the image processing apparatus, wherein the predetermined characteristics are predetermined character data.

It is another object of the present invention to provide the image processing apparatus, wherein the predetermined characteristics are a blank region set between character data strings.

PREFERRED EMBODIMENTS OF THE INVENTION

In an Image processing apparatus provided with a receiving function of a facsimile image, in order to diminish a computational load by efficiently performing character recognition processing of an image received by facsimile, it is significantly important to lessen objects for performing character recognition. In an embodiment according to the present invention, in the image processing apparatus, an amount of images to which character recognition is performed is lessened in accordance with data capacity such as the number of data and an amount of data receivable by a receiving terminal such as a mobile terminal as a transmitting destination of a character recognition result of a facsimile image.

Generally, in a mobile terminal, data which exceeds the number of received characters determined by a service provider or an upper limit value of data amount can not be received because the data is deleted at a server. Further, a user oneself sometimes sets the number of received characters to any values so that a receiving fare is not charged. In an embodiment according to the present invention, a receiving limit value for each transfer destination is registered in the image processing apparatus in advance so that unnecessary character recognition in which receiving is limited at a mobile terminal is not made to be performed.

In addition, in an embodiment according to the present invention, it is made possible that a cover letter template is registered in the image processing apparatus and character string within a receiving upper limit value is extracted from a specific image region so that a user is able to selectively extract contents that are desired for checking.

Hereinafter, description will be given specifically for embodiments of the image processing apparatus according to the present invention with reference to the attached drawings.

Figure 1:
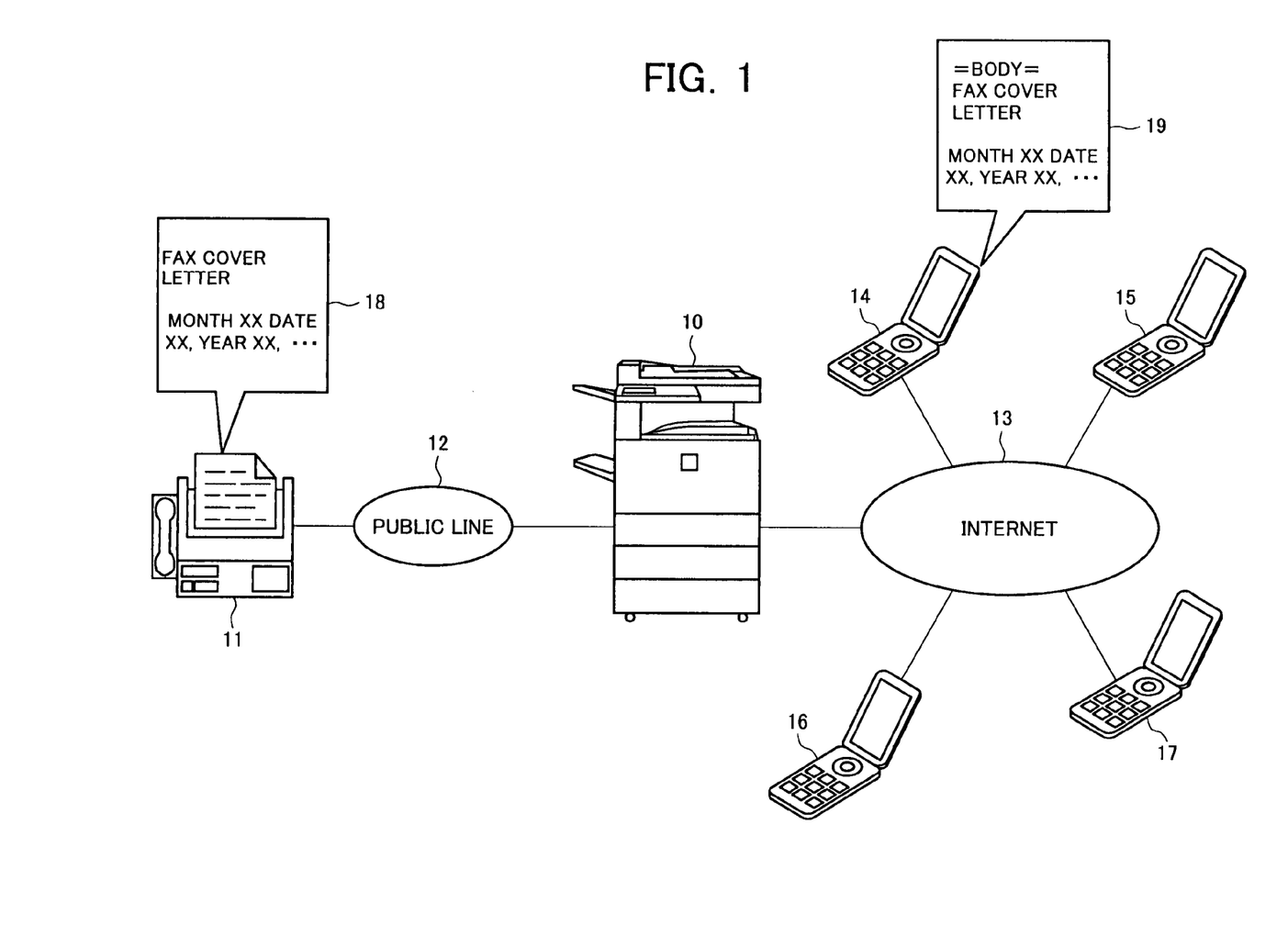
FIG. 1 is a diagram for showing an exemplary system configuration to which an image processing apparatus according to the present invention is applicable.

FIG. 1 is a diagram for showing an exemplary system configuration to which the image processing apparatus according to the present invention is applicable. An image processing apparatus 10 is provided with at least a receiving function of a facsimile image. In addition, the image processing apparatus 10 may be configured as a multi-functional peripheral provided with a copy function, a scanner function, a printer function, a filing function and the like in addition to a facsimile function.

The image processing apparatus 10 is connected to a facsimile terminal 11 through a public line 12. In addition, the image processing apparatus 10 is connected to mobile terminals 14, 15, 16, and 17 through an internet line 13. The mobile terminals 14 to 17 are examples of the mobile computer terminal of the present invention, which is set as a transfer destination of a facsimile image.

When a facsimile image 18 is transmitted together with a facsimile cover letter to the image processing apparatus 10 from the facsimile terminal 11, the image processing apparatus 10 determines a reading region of the received facsimile image 18, applies character recognition processing to the reading region, and transmits the obtained character data electronic mail 19 to specific mobile terminals 14, 15, 16, and 17 by electric mail. Specific functions and operation examples thereof will be described below.

Figure 2:
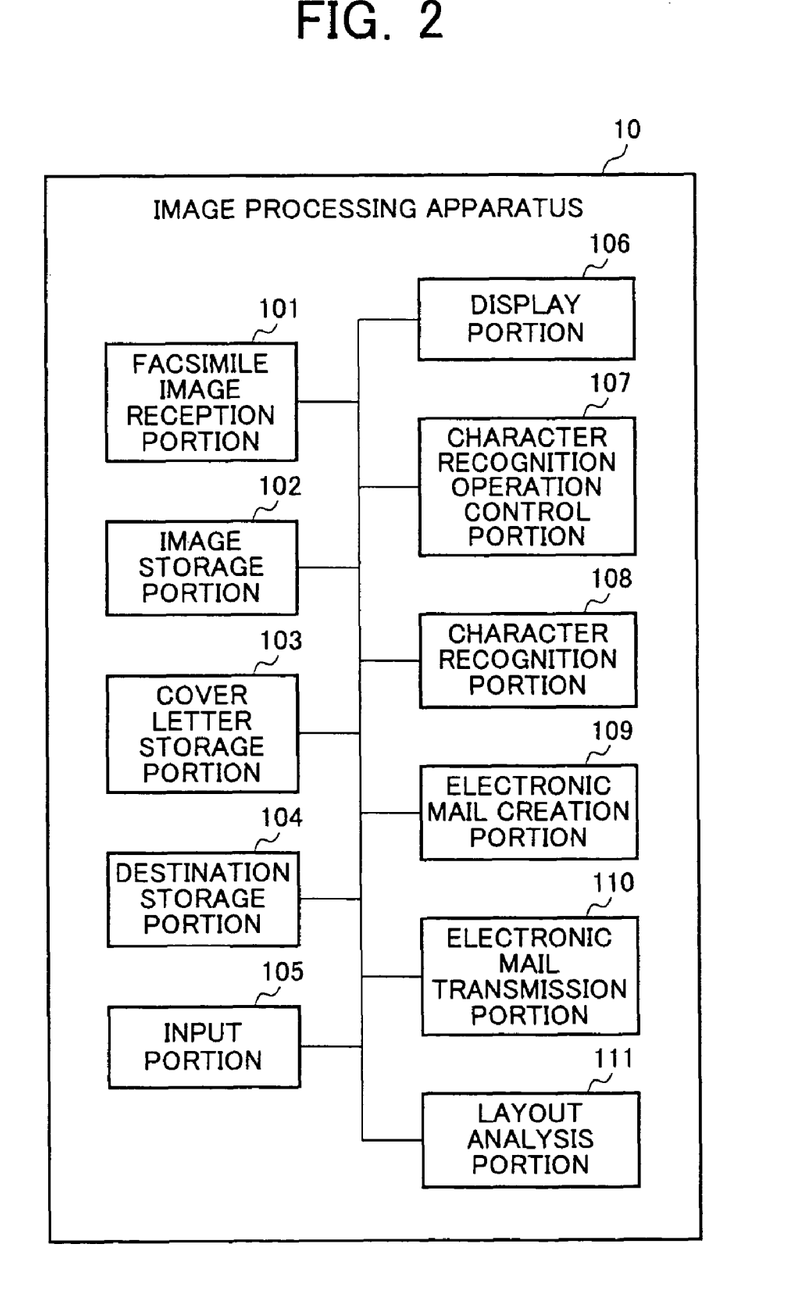
FIG. 2 is a configuration schematic diagram of an embodiment of the image processing apparatus according to the present invention.

FIG. 2 is a configuration schematic diagram of an embodiment of the image processing apparatus according to the present invention. In the diagram, 10 denotes the image processing apparatus, 101 denotes a facsimile image reception portion for obtaining a received facsimile image, 102 denotes an image storage portion for storing a facsimile image, 103 denotes a cover letter storage portion for storing a template of a facsimile cover letter (cover letter template), 104 denotes a destination storage portion for storing a destination to be a transfer destination of a facsimile image, 105 denotes an input portion for enabling an operation input by a user, 106 denotes a display portion for displaying various pieces of information and data, 107 denotes a character recognition operation control portion for controlling character recognition processing for a facsimile image, 108 denotes a character recognition portion for performing the character recognition processing for a facsimile image, 109 denotes an electronic mail creation portion for creating an electronic mail in which character data obtained by the character recognition processing is described, 110 denotes an electronic mail transmission portion for transmitting a created electronic mail, 111 denotes a layout analysis portion for analyzing a layout structure of a facsimile image and dividing the facsimile image into regions in accordance with the analyzed layout structure. The input portion 105 above is comprised of a touch panel provided in the display portion 106, for example. In addition, a numeric keypad, a pointer, a remote controller and the like may be applicable as the input portion 105.

The user is able to store the cover letter template in the cover letter storage portion 103 by performing operation input to the input portion 105 while checking a display on the display portion 106. The cover letter storage portion 103, in a not shown template table, stores a region for reading an image from the cover letter and performing character recognition (reading region) and an image of the cover letter template by making connection with each other. The region to be related to the cover letter template is determined in advance in accordance with each cover letter template, and for example, a region for performing character recognition is determined appropriately in accordance with a format of the cover letter or the like so that the user is able to selectively extract contents that are desired for checking by an electronic mail from a facsimile image.

In addition, the user is able to register an electronic mail address of the transfer destination of the facsimile image to the destination storage portion 104 by performing operation input to the input portion 105 while checking the display on the display portion 106.

Figure 3:
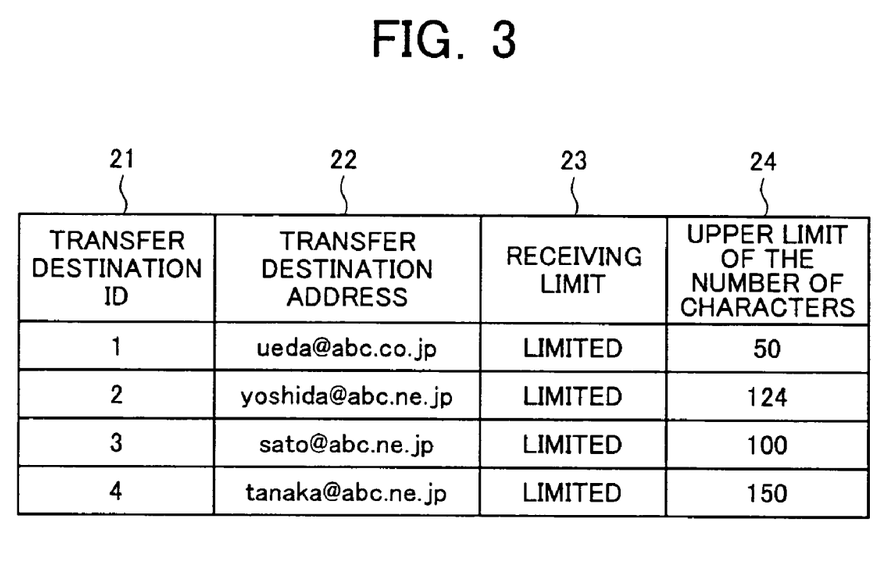
FIG. 3 is a diagram for showing an example of a transfer destination table that is stored in a destination storage portion.

The destination storage portion 104 stores a destination to be the transfer destination of the facsimile image as a transfer destination table. FIG. 3 is a diagram for showing an example of a transfer destination table that is stored in the destination storage portion 104. In FIG. 3, a transfer destination ID 21 is a unique number that is allotted for each transfer destination. A transfer destination address 22 represents an electronic mail address of the transfer destination. A receiving limit 23 represents whether or not an upper limit value of received data is set in a receiving terminal of the transfer destination (mobile terminals 14 to 17 in the example of FIG. 1). That is, the receiving limit 23 shows a flag representing whether an upper limit of the number of characters 24 as receiving limit of the number of characters is set. In this example, all transfer destinations registered in the transfer destination table are objects of transfer of a facsimile image. However, specification of the transfer destination is not limited to this method, and for example, it may be configured such that a transfer switch flag is provided for each transfer destination to be able to transfer to a part of transfer destinations out of the registered transfer destinations. In transferring the facsimile image, actually, character recognition is performed for each divided region obtained by the layout analysis of the facsimile image, and the obtained character data is transferred to the transfer destination in a form of an electronic mail.

Figure 4:
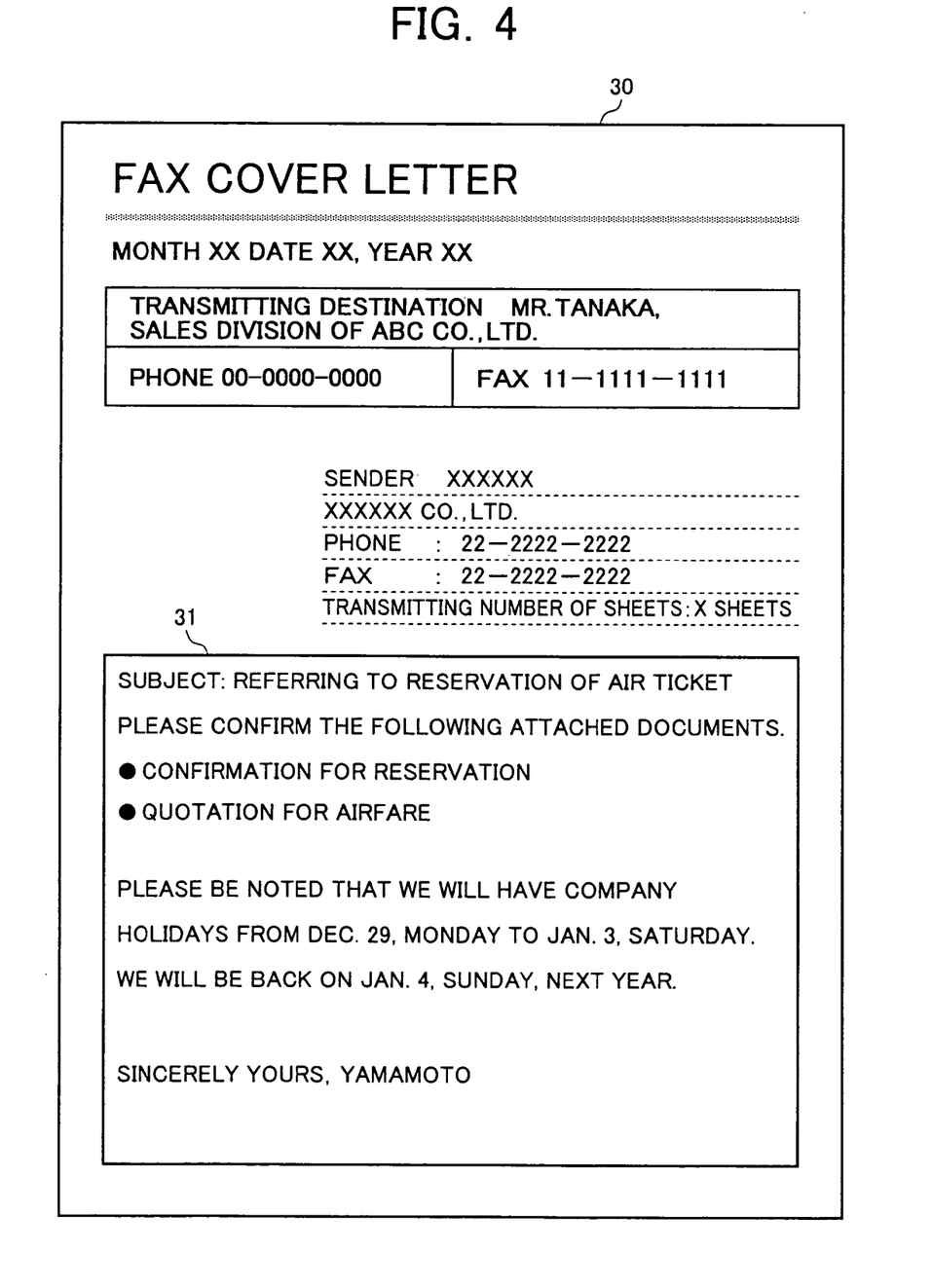
FIG. 4 is a diagram for showing an example of a facsimile image received by the image processing apparatus.
Figure 5:
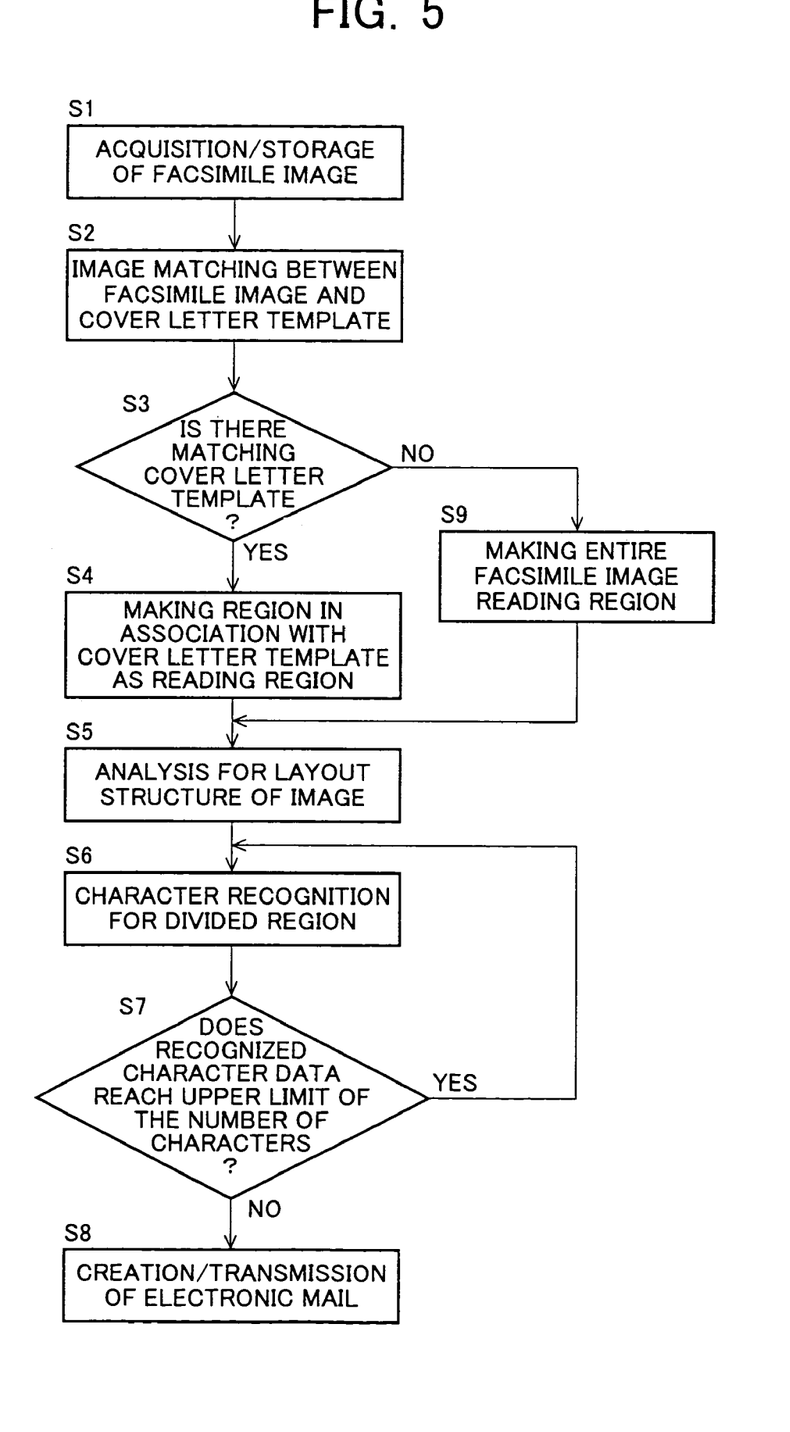
FIG. 5 is a flowchart for explaining exemplary processing of the image processing apparatus according to the present invention.

Next, description will be given for an operation of the image processing apparatus 10. FIG. 5 is a flowchart for explaining an exemplary processing of the image processing apparatus according to the present invention. It is assumed here that the image processing apparatus 10 has received a facsimile image 30 shown in FIG. 4 by facsimile.

First, the image processing apparatus 10 obtains a facsimile image received through a communication line in the facsimile image reception portion 101 to cause the image storage portion 102 to store the received image (processing S1). Subsequently, the image processing apparatus 10 refers to the cover letter storage portion 103 and performs image matching between the obtained facsimile image 30 and the cover letter template (processing S2). A method of image matching is not particularly limited and various methods known conventionally are usable. In this example, the image matching is realized by a method for extracting characteristic shapes such as a size, a configuration, and arrangement of a block constituting a character part that is present in the entire or a part of the facsimile image as an object, arrangement and thickness of lines, ruled lines and the like that are present in the entire or a part of the image, each type of images, etc., and for collating the extracted shapes with the cover letter template.

When a cover letter template matching the facsimile image obtained as a result of the image matching by the processing S2, is stored in the cover letter storage portion 103 (processing S3-Yes), a region related to the cover letter template is a reading region for character recognition (processing S4). In this example, a region related to the cover letter template matching the facsimile image 30 of FIG. 4 is a region 31.

On the other hand, when there are no cover letter templates matching the received facsimile image in the processing S3, the entire facsimile image is a reading region for character recognition (processing S9).

When character recognition is performed for the reading region, the layout structure of the reading region is first analyzed (processing S5). In performing character recognition, algorithm is known for enhancing recognition accuracy by using a word dictionary and a syntax dictionary. Therefore, in the processing S5, the layout structure of images is analyzed for the reading region determined by the processing S4 or the processing S9.

In this example, the layout analysis portion 111 extracts arrangement, thickness and a type of lines, ruled lines and the like constituting a character part that is present in a reading region of the facsimile image 30 to perform processing for dividing regions into sections. For example, each cell of a table described in a reading region is separately divided as sections.

In the following character recognition processing, character recognition processing (processing S6) is then executed for each divided region. The value of the upper limit of the number of characters 24 of all transfer destination IDs of the transfer destination table is then compared to the number of characters of character data obtained by character recognition processing every time character recognition processing finishes in a divided region, and the number of characters of character data that is character-recognized is determined whether or not reaching the upper limit of the number of characters 24 of all transfer destination IDs (processing S7). When character data that is character-recognized reaches the upper limit of the number of characters 24 of all transfer destination IDs, character recognition processing is finished, an electronic mail containing character data that is character-recognized is created, and the electronic mail thereof is transmitted to transfer destination addresses of all transfer destination IDs (processing S8).

On the other hand, when character data that is character-recognized does not reach an upper limit of the number of characters of all transfer destination IDs, character recognition is executed in processing S6 for the following divided region. That is, when a plurality of the transfer destination IDs are stored in the transfer table, character recognition processing is repeated until reaching a maximum value of the upper limit of the number of characters 24.

An effect of an embodiment according to the present invention is that an electronic mail can be created by performing character recognition reading only a minimal amount of a part of characters contained in a facsimile image, and it is possible to make character recognition processing efficiently.

Figure 6:
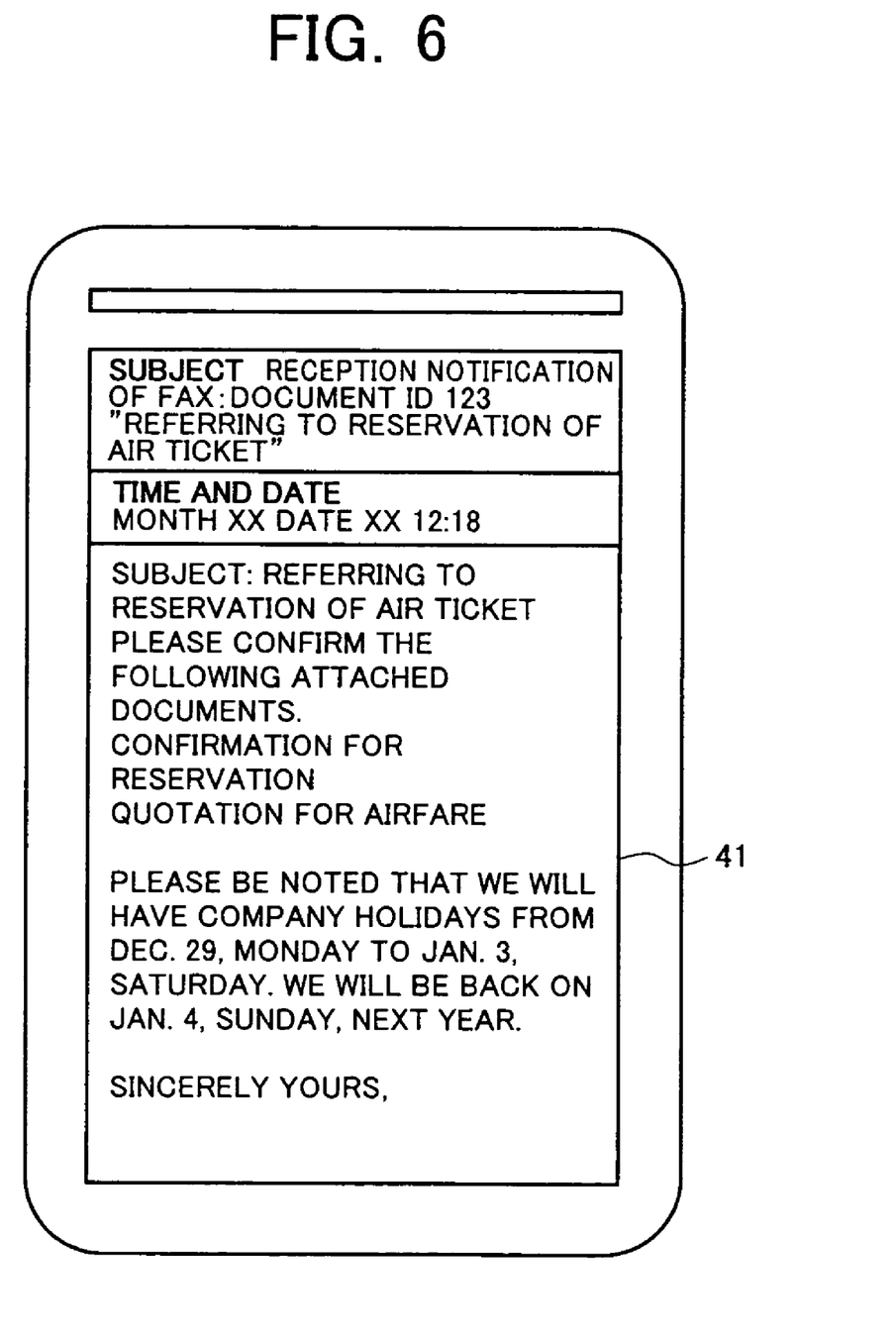
FIG. 6 is a diagram for showing an example of a display screen on a mobile telephone in which a result that character recognition is performed in a reading region shown in FIG. 4 is received by an electronic mail.

FIG. 6 is a diagram for showing an example of a display screen on a mobile telephone in which a result that character recognition is performed in a region 31 shown in FIG. 4 is received by an electronic mail. In this example, it is assumed that the region 31 shown in FIG. 4 is a reading region and a result that character recognition is performed to the reading region thereof is transferred by an electronic mail. Transfer destination ID 21 at this time is "4" shown in FIG. 3, and a screen 41 shown in FIG. 6 shows a screen of a mobile telephone in which the transfer destination ID 21 is set to "4".

As shown in FIG. 3, the upper limit of the number of characters 24 of the transfer destinations in which "4" is set as transfer destination ID 21 is "150" as a maximum value in the transfer destination ID 21 set to the transfer destination table. Therefore, when an electronic mail is created by the image processing apparatus, an electronic mail is created to be transmitted at the time the number of characters obtained by character recognition processing for each divided region reaches 150 characters. Ina screen 41 of a mobile telephone whose transfer destination ID is "4", an electronic mail is displayed in accordance with "150" as an upper limit of the number of characters as shown in FIG. 6.

On the other hand, when there are no cover letter templates matching a facsimile image, the entire facsimile image is a reading region for character recognition processing, while character recognition processing is performed at this time for each divided region from the beginning of the facsimile image and the obtained character data is transmitted as a body of an electronic mail.

Figure 7:
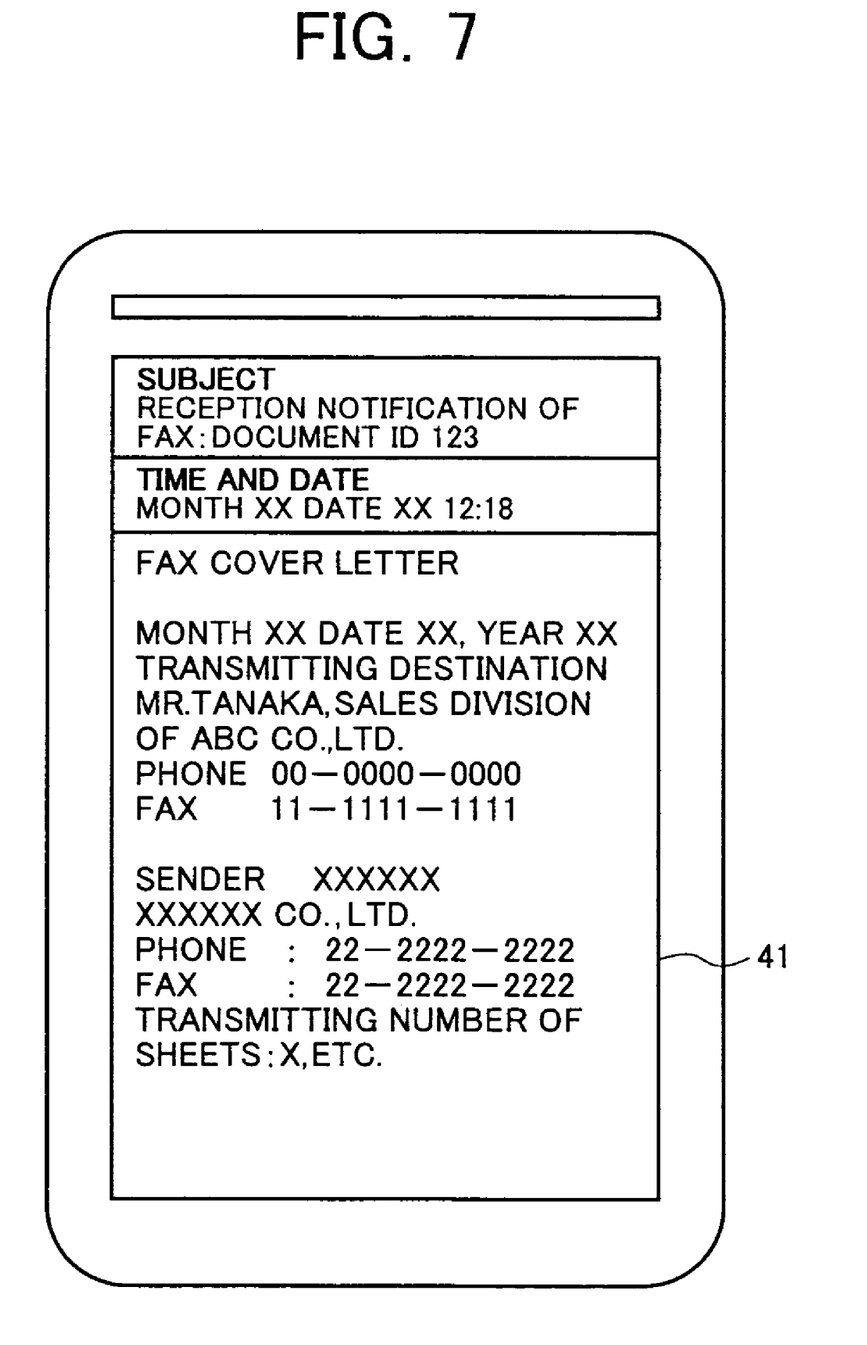
FIG. 7 is a diagram for showing an example of a display screen on a mobile telephone in which a result that character recognition is performed for the entire facsimile image shown in FIG. 4 as a reading region for character recognition is received by an electronic mail.

FIG. 7 is a diagram for showing an example of a display screen on a mobile telephone in which a result that the entire facsimile image shown in FIG. 4 is character-recognized as a reading region for character recognition is received by an electronic mail. Transfer destination ID 21 at this time is "4"

shown in FIG. 3 and the screen 41 shown in FIG. 7 shows a screen of a mobile telephone whose transfer destination ID 21 is set to "4".

Similarly, also in this case, the upper limit of the number of characters 24 of a transfer destination whose transfer destination ID 21 is set to "4" is "150" as a maximum value in the transfer destination ID 21 set to the transfer destination table. Therefore, when an electronic mail is created by the image processing apparatus, an electronic mail is created to be transmitted at the time the number of characters of character data obtained by character recognition processing for each divided region reaches 150 characters. In a screen 41 of a mobile telephone whose transfer destination ID is set to "4", an electronic mail is displayed in accordance with "150" as an upper limit of the number of characters as shown in FIG. 7. Here, an electronic mail is displayed in the same number of "150" characters as that of the display screen of FIG. 6, which case is, however, different from the case of FIG. 6, and character recognition processing is performed from the beginning of the facsimile image 30.

In addition, in the above example of FIG. 3, in the transfer destination table that is stored in the destination storage portion 104, the upper limit of the number of characters 24 that is a value of the receiving limit of the number of characters has been set, however, in place of the upper limit of the number of characters 24, either one of the number of characters or data amount of character data may be settable as an upper limit value. The number of bytes of the character data is usable as a value showing the data amount.

In this case, processing for converting character data that is character-recognized to bytes is added to the processing S7 of FIG. 5. For destinations in which the number of bytes is set as an upper limit value in the transfer destination table, the number of converted bytes is compared to the number of bytes of an upper limit set to the transfer destination table, and when the number of converted bytes reaches an upper limit of the number of bytes, the character data that is character-recognized is transmitted as an electronic mail.

Figure 8:
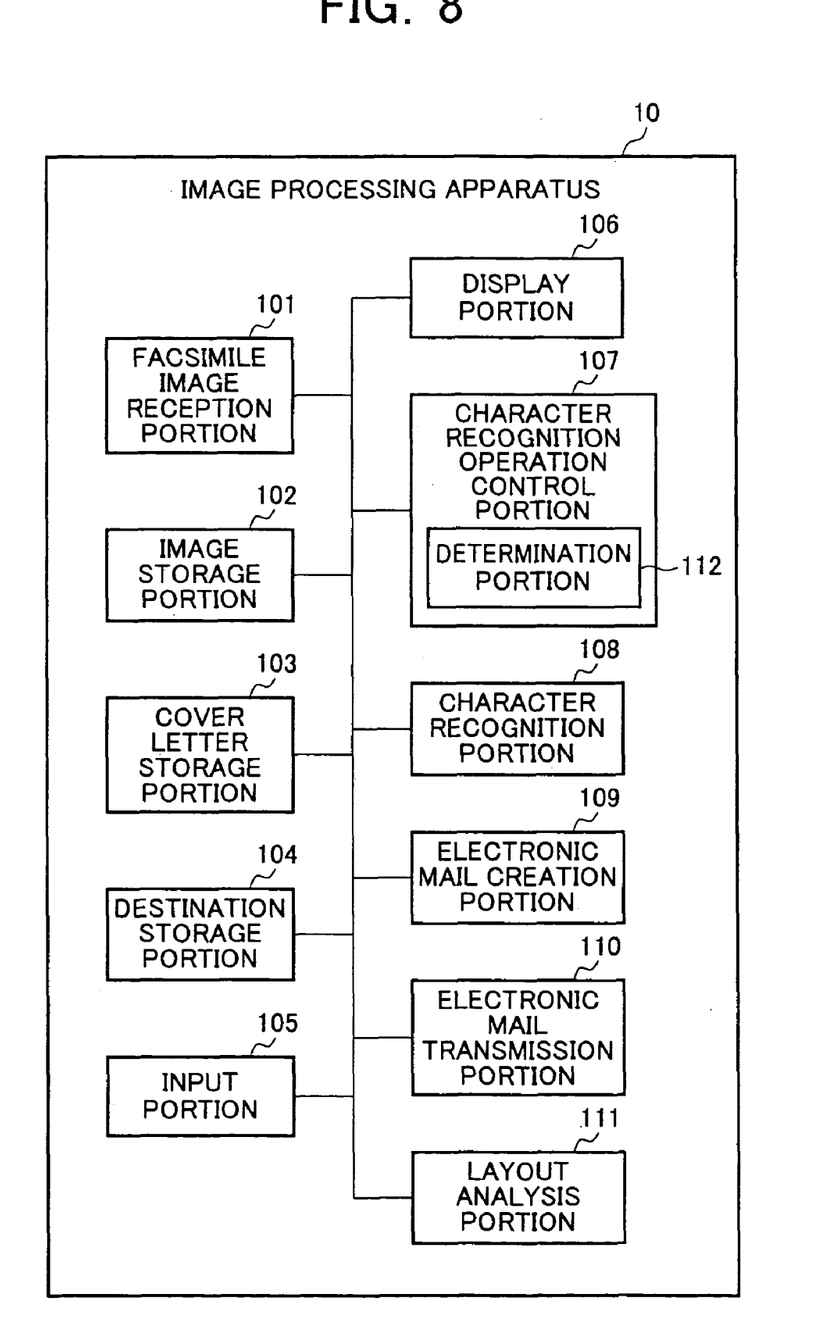
FIG. 8 is a configuration schematic diagram of another embodiment of the image processing apparatus according to the present invention.

FIG. 8 is a configuration schematic diagram of another embodiment of the image processing apparatus according to the present Invention. In FIG. 8, a character recognition operation control portion 107 has a determination portion 112. The determination portion 112 obtains a font size in a region divided by the layout analysis portion 111 to determine whether or not the number of characters describable in the divided region exceeds a set value for limiting received data. Other configurations are the same as those of FIG. 2 and repeated explanations are thus omitted.

In analysis processing of the layout structure in the above processing S4 of FIG. 5, arrangement, thickness and a type of lines, ruled lines and the like constituting a character part that is present in the reading region of the facsimile image 30 are extracted to perform processing for dividing regions as sections. For example, each cell of a table described in the reading region has been separately divided as sections, and character recognition processing is executed for each cell thereof.

The number of characters embedded in one of divided regions sometimes substantially exceeds a set upper limit of the number of characters. Therefore, in the other embodiments according to the present invention, a step for obtaining a font size of a divided region is added to the processing S5 of FIG. 5. At this step, a method for obtaining a font size which is most frequently used in a divided region by distinguishing a character pitch by image analysis, a method for registering a font size in a template in advance and the like are applicable, however, various methods are applicable, not limited particularly to these methods.

As a result of comparing the obtained font size to a size of a divided region, when it is determined that the number of characters describable in a divided region exceeds a maximum value of an upper limit value of the number of characters described in the transfer table, creation/transmitting processing of an electronic mail (S8) are conducted appropriately during performing character recognition for each divided region. In processing S8, when predetermined character data or pattern is detected in character recognition processing, character recognition results so far are transmitted as electronic mails. As the predetermined character data in this case, for example, a period ".", an interrogation mark "?", an exclamation mark "!" and the like are applicable. In addition, as a predetermined pattern, a blank region set between character data strings is applicable. That is, characters and patterns representing a grammatical break in a sentence are detected, and it is then possible to transmit the character recognition results so far by an electronic mail. By this embodiment, even when the number of characters describable in a divided region such as a cell in a table is larger than an upper limit value of the predetermined number of characters, it is possible to restrain processing for recognizing unnecessary character in transmitting an electronic mail.

Note that, the present invention is not limited to the embodiments described above, and various changes are possible in the scope designated in claims. That is, the embodiments obtained by combining technical means that are changed appropriately in the scope designated in claims are also included in a technical scope of the present invention.

According to the present invention, in the image processing apparatus provided with a function of transferring facsimile data received by facsimile to a specific transfer destination by an electronic mail, it is possible to provide an image processing apparatus which reduces the amount of character recognition processing that is performed at the time of transferring facsimile data and is able to shorten transfer time of facsimile data.

The invention claimed is:

1. An image processing apparatus connectable to a communication line, comprising:
   a facsimile image reception portion for obtaining a facsimile image which is received through the communication line;
   an image storage portion for storing the facsimile image which is obtained by the facsimile image reception portion;
   a destination storage portion for storing at least one transfer destination of the facsimile image in association with a set value for limiting received data for each transfer destination;
   a character recognition portion for obtaining character data by character recognition of the facsimile image which is obtained by the facsimile image reception portion;
   a character recognition operation control portion for controlling whether or not character recognition by the character recognition portion is continued by comparing the set value for limiting received data to character data which is obtained by the character recognition portion; and
   an electronic mail creation portion for creating an electronic mail in which character data obtained by the character recognition portion is described in a body of the electronic mail.

2. The image processing apparatus as defined in claim 1, wherein
the set value for limiting received data is a set value for limiting the number of characters of the character data or is a set value for limiting data amount of the character data.

3. The image processing apparatus as defined in claim 2, wherein
the set value for limiting received data is a set value for setting a maximum number of characters or data amount among the number of characters or data amount of character data in association with a plurality of transfer destinations.

4. The image processing apparatus as defined in claim 3, comprising
a cover letter storage portion capable of storing at least one template of a facsimile cover letter in order to specify a region to be read by the character recognition portion.

5. The image processing apparatus a defined in claim 3, comprising
a layout analysis portion having a function of analyzing a layout structure of the facsimile image based on predetermined conditions and dividing the facsimile image into regions depending on the layout structure, and wherein
the character recognition portion obtains character data by performing the character recognition for each of the divided regions.

6. The image processing apparatus as defined in claim 2 comprising
a cover letter storage portion capable of storing at least one template of a facsimile cover letter in order to specify a region to be read by the character recognition portion.

7. The image processing apparatus a defined in claim 2, comprising
a layout analysis portion having a function of analyzing a layout structure of the facsimile image based on predetermined conditions and dividing the facsimile image into regions depending on the layout structure, and wherein
the character recognition portion obtains character data by performing the character recognition for each of the divided regions.

8. The image processing apparatus as defined in claim 1, wherein
the transfer destinations are electronic mail addresses of a portable computer terminal device.

9. The image processing apparatus as defined in claim 8, comprising
a cover letter storage portion capable of storing at least one template of a facsimile cover letter in order to specify a region to be read by the character recognition portion.

10. The image processing apparatus a defined in claim 8, comprising
a layout analysis portion having a function of analyzing a layout structure of the facsimile image based on predetermined conditions and dividing the facsimile image into regions depending on the layout structure, and wherein
the character recognition portion obtains character data by performing the character recognition for each of the divided regions.

11. The image processing apparatus as defined in claim 1, comprising
a cover letter storage portion capable of storing at least one template of a facsimile cover letter in order to specify a region to be read by the character recognition portion.

12. The image processing apparatus a defined in claim 1, comprising
a layout analysis portion having a function of analyzing a layout structure of the facsimile image based on predetermined conditions and dividing the facsimile image into regions depending on the layout structure, and wherein
the character recognition portion obtains character data by performing the character recognition for each of the divided regions.

13. The image processing apparatus as defined in claim 12, wherein
the character recognition operation control portion has a determination portion for determining whether the number of characters describable in the region where the font size is obtained exceeds the set value for limiting received data by obtaining a font size in the divided region.

14. The image processing apparatus as defined in claim 13, wherein
the character recognition operation control portion determines whether the character recognition is continued every time predetermined characteristics are obtained from the result of character recognition by the character recognition in a case where the number of characters describable in the region where the font size is obtained in the determination portion exceeds the set value for limiting received data.

15. The image processing apparatus as defined in claim 14, wherein
the predetermined characteristics are predetermined character data.

16. The image processing apparatus as defined in claim 14, wherein
the predetermined characteristics are a blank region set between character data strings.

* * * * *